US011704577B1

United States Patent
Chen et al.

(10) Patent No.: US 11,704,577 B1
(45) Date of Patent: *Jul. 18, 2023

(54) HIGH PERFORMANCE MACHINE LEARNING INFERENCE FRAMEWORK FOR EDGE DEVICES

(71) Applicant: Amazon Technologies, Inc., Seattle, WA (US)

(72) Inventors: Gang Chen, Fremont, CA (US); Long Gao, San Jose, CA (US); Eduardo Manuel Calleja, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,945

(22) Filed: Apr. 8, 2022

Related U.S. Application Data

(63) Continuation of application No. 16/179,217, filed on Nov. 2, 2018, now Pat. No. 11,301,762.

(51) Int. Cl.
*G06N 5/02* (2023.01)
*G06N 20/00* (2019.01)
*G06F 16/11* (2019.01)

(52) U.S. Cl.
CPC .......... *G06N 5/027* (2013.01); *G06F 16/116* (2019.01); *G06N 20/00* (2019.01)

(58) Field of Classification Search
CPC ....... G06N 5/027; G06N 20/00; G06F 16/116
USPC ......................................................... 706/12
See application file for complete search history.

(56) References Cited

U.S. PATENT DOCUMENTS

| | | |
|---|---|---|
| 2013/0085882 A1 | 4/2013 | Gounares et al. |
| 2014/0173393 A1 | 6/2014 | Roy et al. |
| 2017/0093882 A1 | 3/2017 | Khuu et al. |
| 2018/0060759 A1 | 3/2018 | Chu et al. |
| 2019/0102700 A1 | 4/2019 | Babu et al. |

OTHER PUBLICATIONS

Huang, et al., "When deep learning meets edge computing", 2017 IEEE 25th International Conference on Network Protocols (ICNP), 2017 (Year: 2017).*
Abadi, et al., TensorFlow: Large-Scale Machine Learning on Heterogeneous Distributed Systems, Preliminary White Paper, Nov. 9, 2015, arXiv:1603.04467v2 [cs.DC] Mar. 16, 2016 (Year: 2016).
Non-Final Office Action, U.S. Appl. No. 16/179,217, dated Jun. 3, 2021, 21 pages.
Notice of Allowance, U.S. Appl. No. 16/179,217, dated Dec. 7, 2021, 19 pages.

* cited by examiner

*Primary Examiner* — Tsu-Chang Lee
(74) *Attorney, Agent, or Firm* — Nicholson De Vos Webster & Elliott LLP

(57) ABSTRACT

Techniques for high-performance machine learning (ML) inference in heterogenous edge devices are described. A ML model trained using a variety of different frameworks is translated into a common format that is runnable by inferences engines of edge devices. The translated model is optimized in hardware-agnostic and/or hardware-specific ways to improve inference performance, and the optimized model is sent to the edge devices. The inference engine for any edge device can be accessed by a customer application using a same defined API, regardless of the hardware characteristics of the edge device or the original format of the ML model.

20 Claims, 10 Drawing Sheets

HIGH PERFORMANCE MACHINE LEARNING INFERENCE FRAMEWORK FOR EDGE DEVICES

CROSS-REFERENCE TO RELATED APPLICATION

This application is a continuation of U.S. patent application Ser. No. 16/179,217, filed on Nov. 2, 2018, which is hereby incorporated by reference in its entirety.

BACKGROUND

With recent advancements in machine learning, a natural next step is to deploy models on "edge" devices in various environments, such as "smart" cameras, mobile devices such as smart phones, smart speakers, in motor vehicles, etc. This configuration can have the potential to allow inferences to be generated quicker (e.g., on a same device that obtains the data upon which the inference is generated, instead of remotely—such as in a cloud network or other centralized location) and enable faster reactions to these inferences to occur.

However, the hardware available to generate inferences (e.g., processing units such as central processing units (CPUs), graphical processing units (GPUs), tensor processing units (TPUs), field programmable gate arrays (FGPAs), etc., the amounts and types of available memory, etc.) and the architectures of these hardware resources (e.g., instruction set architectures (ISAs) such as x86, ARM, MIPS, SPARC) vary significantly from one edge device to another. A consequence of these variations in hardware and architecture is that optimal inference speeds can only be achieved with vendor-specific software. This creates an undesirable coupling between hardware and software, which leads to applications being extremely difficult to port from one device type to another device type.

BRIEF DESCRIPTION OF DRAWINGS

Various embodiments in accordance with the present disclosure will be described with reference to the drawings, in which.

DETAILED DESCRIPTION

Figure 1:
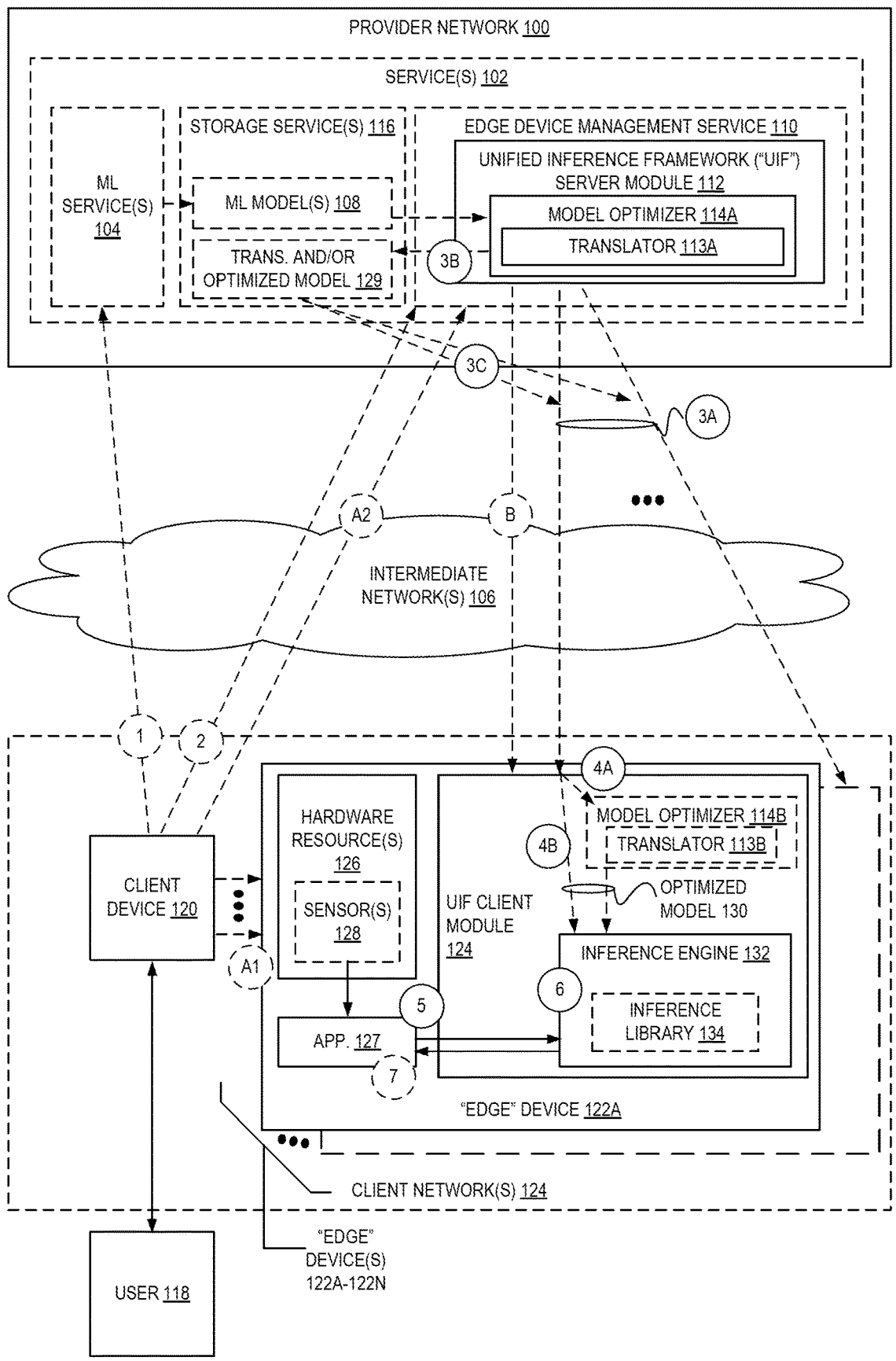
FIG. 1 is a diagram illustrating an exemplary environment including a unified inference framework server module according to some embodiments.

Various embodiments of methods, apparatus, systems, and non-transitory computer-readable storage media for high-performance machine learning inference for heterogenous edge devices are described. According to some embodiments, a unified inference framework for heterogenous edge devices is provided that can accept machine learning (ML) models from a user in any of multiple formats (as generated by multiple different frameworks), convert and optimize these ML models for use by heterogeneous "edge" devices having heterogeneous computing resources, and deploy these ML models for use in one or more edge devices of one or more different types.

In some embodiments, the ML models can be optimized—possibly in a hardware specific or hardware class specific way—at the memory and/or scheduling level to achieve high computing performance on different types of hardware provided by different edge devices. In some embodiments, the ML models can be simply deployed to different edge devices, resulting in the ML models being extremely portable in where they can be run. For example, in some embodiments the framework can work with both a graphics processing unit (GPU) and central processing unit (CPU), across different hardware architectures such as an x86 CPU, ARM CPU, and/or GPU—or even to devices utilizing field programmable gate arrays (FPGAs) or microcontrollers. As a result, users seeking to run a ML model on a particular device or group of devices can be insulated from the hardware-specific challenges in such a deployment—instead, upon requesting a deployment, everything will "just work" from the user's standpoint. Further, some embodiments provide a single, unified set of user application programming interfaces (APIs) for users to perform model optimization and/or inference, which can allow for a user's application code to be simple via use of a single set of APIs enabling use with potentially multiple different types of devices.

As indicated herein, the field of machine learning (and the specific category of deep learning) is developing extremely quickly. Many people and organizations are looking to machine learning to improve system availability through predictive maintenance, invent entirely new experiences on behalf of their customers, lower costs through automation, etc. In some cases, Internet of Things (IoT) devices—also commonly referred to as "edge" devices—are poised to play a central role in driving these improvements as running machine learning becomes more efficient and edge hardware capabilities continue to accelerate. However, successfully implementing machine learning at the edge in a sustainable and manageable way is elusive. First, due to their size, machine learning models are cumbersome to manage and deploy reliably. As a result, such models are rarely deployed to edge devices, lessening the likelihood of continually improving capabilities through the re-training of models. Second, many original equipment manufacturers (OEMs) and partners invest significant resources in developing hardware-specific optimizations to achieve adequate performance, and then have to hand-tune models for their specific environment. This can take many months and requires extremely deep knowledge of both hardware and machine learning. Moreover, data collected by edge devices often ends up going to waste since improved models are slow to engineer, and risky to deploy and manage at scale, meaning that once deployed, edge-based IoT strategies calcify and become brittle over time. Finally, as it is important for ML models running inference to be extremely efficient (e.g., to execute quickly due to a large amount of data requiring inference), deploying models to edge devices becomes extremely difficult when the edge devices have heterogeneous hardware resources—e.g., the existence or non-existence of CPU cores, GPUs, FPGAs, etc., differing architectures (x86, ARM, etc.), different resource amounts and availabilities (e.g., amounts of random access memory (RAM)), etc., Thus it is difficult to deploy efficient, optimized models to run inference to different devices having different resources.

Embodiments disclosed herein allow users to implement machine learning at the edge in a manageable and sustainable way. Further, some embodiments can provide a flywheel for ML on connected devices, allowing users to deploy models across potentially millions of devices and continually improve them. Data can be collected in a secure manner from devices and used to train new models, which can be re-deployed to devices. This in turn generates new data for additional cycles of re-training and re-deployment, where each cycle can increase availability of the system and improve device experiences.

Embodiments can utilize a provider network-based automated verification of model integrity, and/or model deployments and versions can be tracked in a provider network, giving a real-time view into deployment status across a fleet of edge devices.

Once ML models are deployed to the device(s), inferencing can be executed using a fast machine learning inference engine, which may leverage efficient thread-pooling and/or reinforcement learning to automatically optimize models for any hardware platform. Embodiments can also allow developers to quickly and continually improve their models. By automatically collecting low-confidence predictions from devices and syncing them with a provider network, these 'gaps' in the model can be closed and corrected (e.g., through human annotation or other techniques).

Thus, instead of developers needing to build and install a particular ML framework chosen by a data scientist for training on target devices, learn how to use the ML framework, writing ML framework-specific code in their application to load the model, prepare input for inference, and run inference to get prediction, developers can simply provide a trained model, send a simple request to deploy it to one or more electronic devices (which may or may not be homogeneous), and use a pre-defined API in their applications to perform inference.

FIG. 1 is a diagram illustrating an exemplary environment including a unified inference framework ("UIF") server module 112 according to some embodiments. The UIF server module 112, in some embodiments, is a portion of software allowing users 118 to deploy and manage high performance machine learning models 130 running on connected devices 122 in production. Users 118 (e.g., individuals, organizations, even OEMs) can import to—or train machine learning models in—a provider network 100 ("the cloud"), and reliably deploy these models to large numbers of devices 122 at the edge. Embodiments can—via a model optimizer 114 of a UIF server module 112 and/or UIF client module 124—automatically tune ML models for optimal performance across multiple underlying hardware platforms, resulting in improved prediction/inference speeds that allow sophisticated computer vision, audio, and anomaly detection models to run efficiently, even on low-power devices.

The UIF server module 112 may be software executed by one or more multiple computing devices of a provider network 100 and may serve as part of an edge device management service 110 (e.g., a service of multiple services 102 provided by the provider network 100), though in some embodiments the UIF server module 112 may operate as part of another service 102 or as a component of another application. A provider network 100 provides users 118 with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users 118 (or "customers") of provider networks 100 may utilize one or more user accounts that are associated with a customer account, though these terms may be used somewhat interchangeably depending upon the context of use. Users may interact with a provider network 100 across one or more intermediate networks (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

According to some embodiments, a user 118 may utilize a client device (e.g., client device 120) such as a Personal Computer (PC), laptop or other mobile device such as a smartphone, tablet, etc., to manage the deployment of a ML model to one or more edge devices 122A-122N.

Ones of the edge devices 122A-122N may be preconfigured (e.g., at or after manufacture time, such as by an OEM or other provider) with a UIF client module 124. For example, an edge device 122A may include firmware or other pre-installed software including the UIF client module 124. Alternatively, a user may cause the UIF client module 124 to be deployed to the one or more edge devices 122A-122N. For example, the user 118 may use client device 120 to "log in" to an edge device 122A (e.g., via SSH, telnet, web application, etc.) and issue commands to the device 122A to install software (including the UIF client module 124), etc., at circle (A1). As part of installing this software, the UIF client module 124 may contact an edge device management service 110 and provide (or acquire, as assigned by the UIF server module 112) an identifier of itself, an identifier of the user 118 (or user/customer account), etc.

The edge device management service 110 may comprise software executed by one or multiple server computing devices of a provider network 100 that allows users to send requests (e.g., web service application programming interface (API) calls) to deploy, update, and/or otherwise utilize computing devices (e.g., edge devices 122A-122N) that execute outside of the provider network 100.

The user 118 may also more directly register one or more edge devices 122A-122N with the edge device management service 110 of the provider network 100. As shown at circle (A2), the user 118 may cause the client device 120 to send one or more registration request message(s) to the edge device management service 110 to "register" these devices, which may associate the devices with an account of the user within the provider network 100. The registration request message(s) may include identifiers of these devices, such as a media access control (MAC) address of each device, descriptions/categorizations of these devices (e.g., a manufacturer, model name and/or number), network addresses (e.g., Internet Protocol (IP) addresses) for the device(s), public key information of each device, etc. This registration may cause the edge device management service 110 to send UIF client module 124 code (e.g., source code, packages, binaries, etc.) to the edge device(s) 122 as shown at circle (B) to be installed (or "provisioned") at the one or more edge devices 122A-122N.

To manage and deploy ML models to the one or more edge devices 122A-122N, the user 118 may obtain and provide a ML model 108 in a variety of ways. For example, as shown by optional circle (1), a user 118 may utilize a client device 120 to interact with a machine learning (ML) service 104 (of a same provider network 100, different provider network, or otherwise implemented) to train a ML model 108, which may be stored in a storage service 116 of the provider network 100. These interactions may be implemented using web service calls (e.g., HyperText Transfer Protocol (HTTP) request messages) sent to one or more endpoints associated with the ML service(s) 104 and/or provider network 100, causing the ML service to train a ML model using a particular ML framework, training data, hyperparameters, etc. Additional detail describing exemplary systems and techniques for generating ML models is presented herein with regard to FIG. 6.

In this scenario, the user 118 may cause the client device 120 to send, at circle (2), a request to deploy the ML model(s) 108 to one or more edge devices 122A-122N. The request may identify a storage location where the model is located (e.g., a URL/URI where the model file or files are available, which may be within or outside of the provider network 100), as well as identify a particular edge device 122A, multiple individual edge devices 122A-122N, or a group of edge devices (e.g., "store_security_cameras") to deploy the ML model 108 to. In the case of multiple edge devices or a group of edge devices, the devices may be homogeneous (and thus have homogenous hardware computing resources) or heterogeneous (and thus have differing hardware computing resources). With the identifier of the model storage location, the edge device management service 110 may obtain the one or more files making up the ML model 108.

As another example, the ML model 108 may be provided with the request by the client device 120 directly to the edge device management service 110 (e.g., as an uploaded set of files, via a form submission of a webpage or FTP upload, etc.). This may be beneficial when, for example, the user 118 as trained the ML model 108 using another system (outside of the provider network 100), and simply seeks to provide an existing model to the edge device management service 110.

In response to the request, the UIF server module 112 may perform one or more optimization tasks with a model optimizer 114A. The model optimizer 114A may be a software module executed by one or more computing devices and may perform various general and/or device-specific optimizations of the ML model 108.

For example, in some embodiments a translator 113A module (e.g., library, function, binary, etc.) of the model optimizer 114A translates the ML model 108 from a first format (as generated by a particular ML framework) into a "common" second format that is "unified" in that it can be run by all inference engines 132 of all edge devices 122. Generally speaking, ML models are generated in a format that is specific to a particular framework. For example, a model trained using the TensorFlow framework is created in a particular format, which needs to be run by a system that can accommodate that particular format. Thus, a device having another framework installed (e.g., MXNet, Caffe, PyTorch, Microsoft Cognitive Toolkit, etc.) will not be able to run the model, and the same is true for other models created by use of other frameworks. Moreover, many of these frameworks are so large and computationally intensive that they are not suited for deployment on often (comparatively) resource-constrained edge devices. Thus, by translating the ML model 108 into a common format, the model optimizer 114A can make the model "portable" in that it can be run at any/all of the one or more edge devices 122A-122N using a common inference engine 132 (e.g., via use of an inference library 134). This translation can be performed using tools and techniques known to those of skill in the art, which may include using a conversion library/module that identifies certain values (e.g., weights) in model files generated by a first framework and inserts them in a different format (or location) within files adherent to a different framework or format (e.g., a different framework's format, a standardized "generic" format such as the Open Neural Network eXchange format "ONNX", etc.). As another example, the translator may create low-level machine code that is executable for multiple types of hardware backends. However, in some embodiments the translator module 113B may be implemented at a particular edge device 122A and thus the translation may occur there.

In some embodiments, the (possibly translated) model can be provided to the one or more edge devices 122A-122N (e.g., as indicated by the deployment request) directly (via circle (3A)), or by storing the (at least partially) optimized model 129 (e.g., a translated model, a translated and partially optimized model, an optimized model, etc.) in a storage service 116 at circle (3B), where it can be obtained by the one or more edge devices 122A-122N as shown at circle (3C), e.g., via the one or more edge devices 122A-122N sending requests (e.g., web service requests) to download the optimized model 129 files.

However, in some embodiments the UIF server module 112 may also perform other model optimizations (e.g., in addition to, or alternatively to, performing the translation described above). For example, the UIF server module 112 may perform computational graph optimizations (that are hardware agnostic) and/or hardware-specific optimizations.

In some embodiments, the model optimizer 114 may optimize the model by performing layer fusion or similar optimizations. As is known to those of skill in the art, some machine learning models (e.g., some types of neural networks) can be modified—e.g., layers with unused output can be eliminated to avoid unnecessary computation, certain layers (e.g., certain convolutional layers, batch norm layers, bias layers, and/or ReLU activation layers) can be combined or "fused" to form a single layer, layers can be combined layers via layer aggregation that take a same source tensor and apply the same operations with similar parameters to result in a single larger layer for higher computational efficiency. As another example, in some embodiments the model optimizer 114 may optimize the model by performing quantization where certain data types may be changed (e.g., floating point values can be changed to integers) to reduce inference computational latency (albeit at a potential expense of accuracy). Moreover, in some embodiments, the model optimizer 114 may optimize the model by analyzing the model and performing kernel fusion (e.g., similar to layer fusion, albeit one layer down in the stack and thus different kernels for different operators can be fused together), etc. As an additional example, the optimizations may include customizing the model based on a device context of the edge device(s) 122, e.g., what specific processor(s) each has, drivers each has, graphics processing unit(s) each has, etc.

Thus, an optimized model 129—whether it is simply translated, optimized, or both translated at optimized for execution—is provided to the identified one or more edge devices 122A-122N. In some embodiments, as shown at circle (4A), the at least partially optimized model 129 may be further optimized by an on-device model optimizer 114B, which may perform any or all of the above-described optimizations and may also or alternatively perform optimizations that are hardware specific. For example, the model optimizer 114B may translate the model using a translator 113B, implement hardware-agnostic optimizations, or optimize the model for improved (or optimal) scheduling (of how to run computation). As an example, in some embodiments the model optimizer 114B may implement data-driven scheduling, which includes running inference (using the model) for some amount of time, and then backing out what the optimal schedule is from observing the data.

Thus, the (possibly optimized) model provided to each edge device 122 at (3A) or (3C) may be further optimized (at (4A)) or not further optimized (circle (4B)), and then provided to an inference engine 132 as optimized model 130. The optimized model 130 may be in a variety of different formats based on the particular implementation. As one example, the optimized model 130 can include a first file carrying a graph-based representation of the model (e.g., in JSON/XML) indicating the structure of a neural network, and include another file carrying the model weights. As another example, the optimized model 130 may include three Intermediate Representation (IR) files: a JSON file describing the optimized graph, a "params" file saving the values of model parameters, and a "so" file for the inference engine to run the model inference.

The one or more edge devices 122A-122N may then operate as intended, e.g., by an application 127 capturing/creating input data via one or more sensors 128 (e.g., optical sensors, audio sensors, temperature sensors, humidity sensors, air pressure sensors, gas sensors, moisture sensors, water flow sensors, weight sensors, motion sensors, global positioning system (GPS) sensors, rotation/acceleration sensors, radio sensors, biological sensors (e.g., pulse sensors), fingerprint sensors, and the like. This input data, at circle (5), is provided to the inference engine 132 which at circle (6) can perform inference using the optimized model 130 and optionally logic of an inference library 134. The inference engine 132 itself, or another application 127 executed by the one or more edge devices 122A-122N, at optional circle (7) may perform inference actions based on the inference values (or when the inference values satisfy some condition, e.g., when they exceed a threshold value). For example, the corresponding input data (and/or previous or surrounding input data points, and/or the inference predictions themselves) may be stored in a non-volatile storage, sent in a network message to a storage service 116 in a same or different network (e.g., in provider network 100) for further analysis, etc. As another example, the input data or inferences could be sent to a machine learning service, sent to a data monitoring/logging service, stored in a database, sent to a serverless code execution service to be processed, etc., allowing users to take "local" inference results generated by edge devices and integrate these results into an overall application 127 in nearly any manner desired by the users.

Notably, in some embodiments the model optimizer 114B and/or inference engine 132 may utilize a common set of APIs (across disparate types of deployments) to optimize a model, load a model, and/or perform inference, allowing the application 127 to be easily written to interact with the model optimizer 114B and/or inference engine 132, and flexibly be deployed in a number of different hardware environments. For example, the UIF client module 124 may expose an "optimize" method to applications that allows the application to obtain a model (e.g., by downloading a translated and/or optimized model from the storage service(s) 116 or edge device management service 110 and have the local model optimizer 114B optimize the model. As another example, the UIF client module 124 may expose a "model" method (including an argument identifying a path or location of an optimized model) that creates/loads a model instance in the inference engine 132, and a "Model..doInference" method (with a parameter comprising the input data—e.g., an image) upon which the inference is to be performed.

Figure 2:
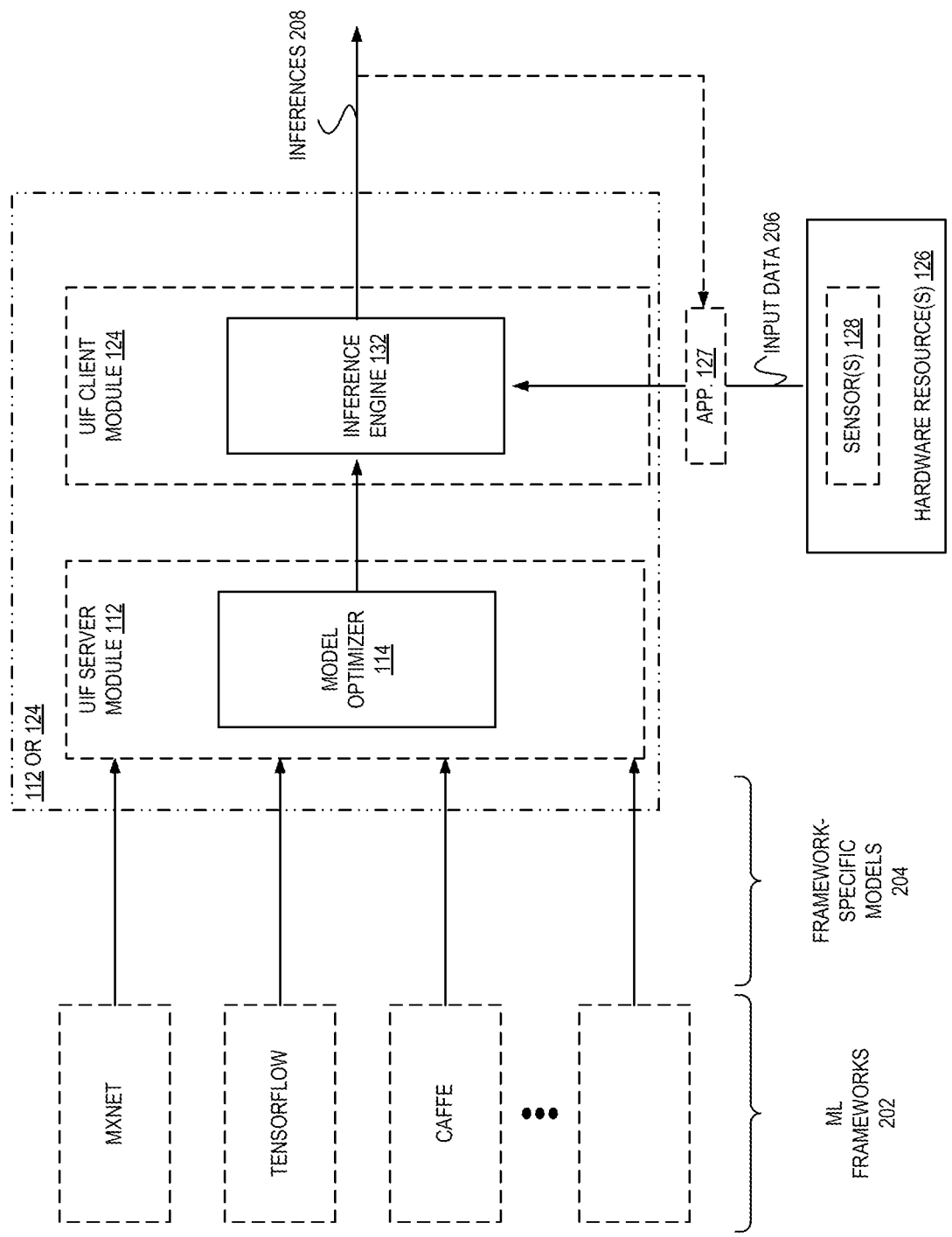
FIG. 2 is a diagram illustrating an exemplary architecture for high-performance machine learning inference according to some embodiments.

For an abstracted view of certain aspects disclosed herein, FIG. 2 is a diagram illustrating an exemplary architecture for high-performance machine learning inference according to some embodiments. As shown, a number of framework-specific models 204 generated using a number of machine learning frameworks 202 (e.g., MXNet, TensorFlow, Caffe, etc.) can be provided to one or more model optimizers 114A/114B to be translated and optimized, resulting in an optimized model being provided to an inference engine 132 that can run the optimized model with input data 206 generated using hardware resources 126 (such as one or more sensors 128) to generate inferences 208. As alluded to herein, in some embodiments the UIF client module 124 may be a software stack provided to users, or pre-installed on certain edge devices, so users don't have to do anything other than just provision/register the device(s). In other embodiments, the users may instead self-provision and install the UIF server module 112 on the device(s) themselves.

Figure 3:
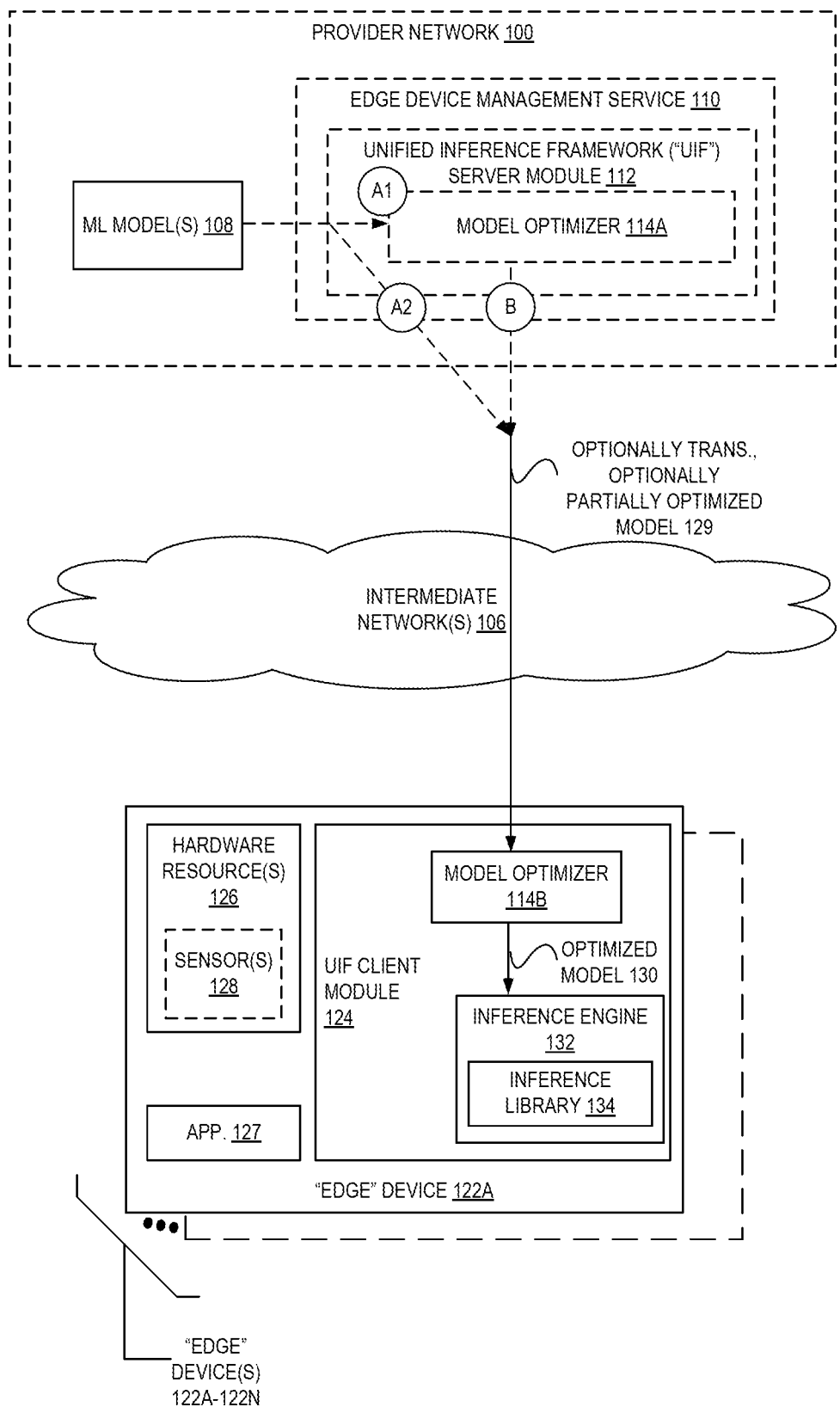
FIG. 3 is a diagram illustrating an exemplary environment with complete or partial edge optimization according to some embodiments.

FIG. 3 is a diagram illustrating an exemplary environment with complete or partial edge optimization according to some embodiments. As shown at circle (A1), in some embodiments a ML model 108 in a format pertaining to a particular framework can be provided to a UIF server module 112 that can perform translation of the model into another common format, which may be sent as model 129 at circle (B) to be optimized by each on-device model optimizer 114B and then used by the inference engine 132. Alternatively, the UIF server module 112 can perform translation of the model into another common format and also (partially) optimize the model, resulting in a translated and partially-optimized model 129 that may be sent at circle (B) to be optimized by each on-device model optimizer 114B and then used by the inference engine 132 as model 130. Alternatively, the UIF server module 112 may simply provide the ML model 108 at circle (A2) to be translated and possibly further optimized by each on-device model optimizer 114B and then used by the inference engine 132 as model 130

Figure 4:
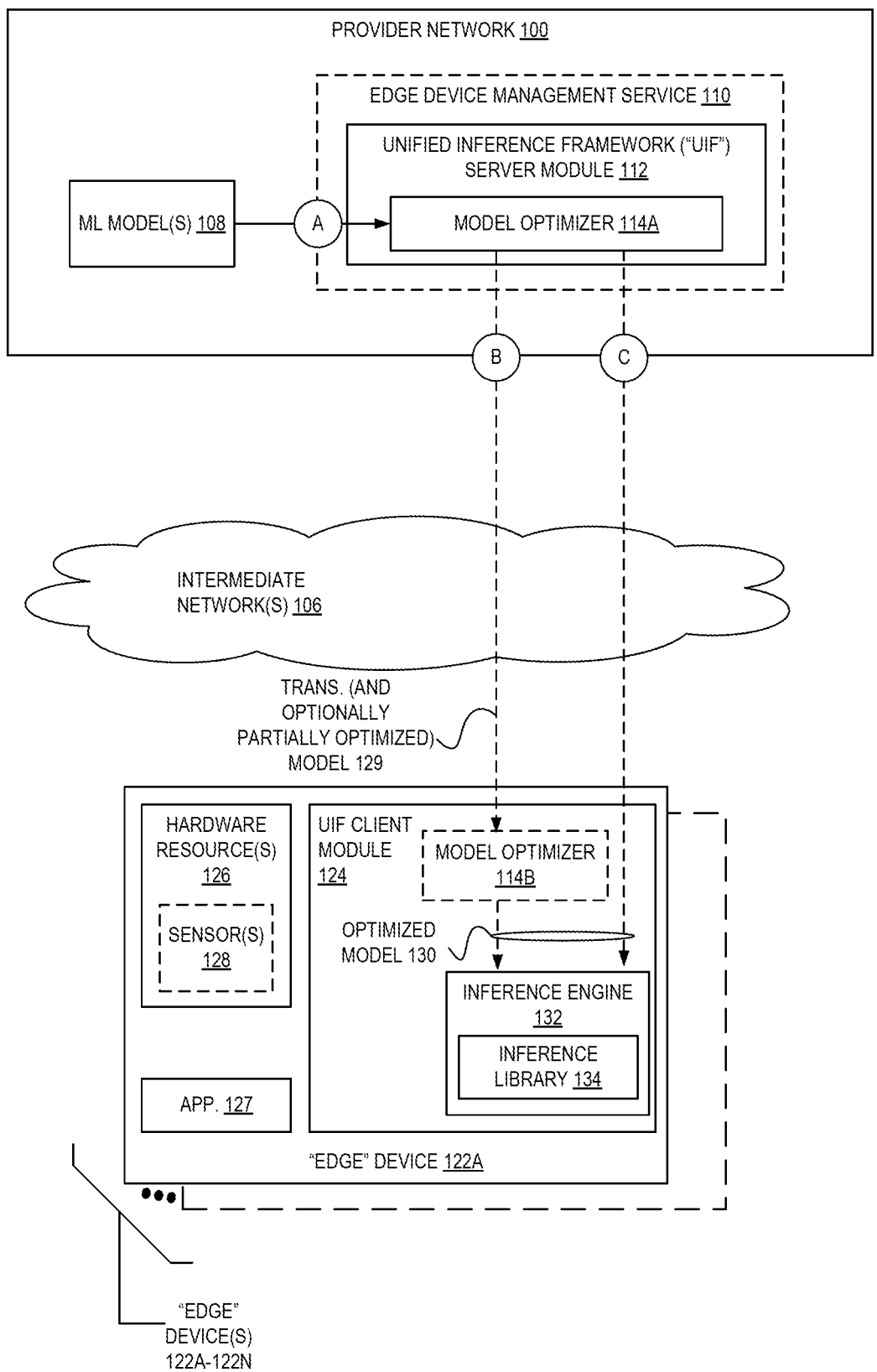
FIG. 4 is a diagram illustrating an exemplary environment with complete or partial provider network optimization according to some embodiments.

As another example, FIG. 4 is a diagram illustrating an exemplary environment with complete or partial provider network optimization according to some embodiments. As shown at circle (A), in some embodiments a ML model 108 in a format pertaining to a particular framework can be provided to a UIF server module 112 that can perform translation (and optionally, partial optimization) of the model into another common format, which may be sent at circle (B) to optionally be further optimized by each on-device model optimizer 114B and then used by the inference engine 132. Alternatively, the UIF server module 112 can perform translation of the model into another common format and also partially or completely optimize the model, resulting in an optimized model that may be sent at circle (C) to be used by the inference engine 132 of each edge device without on-device optimizations.

Figure 5:
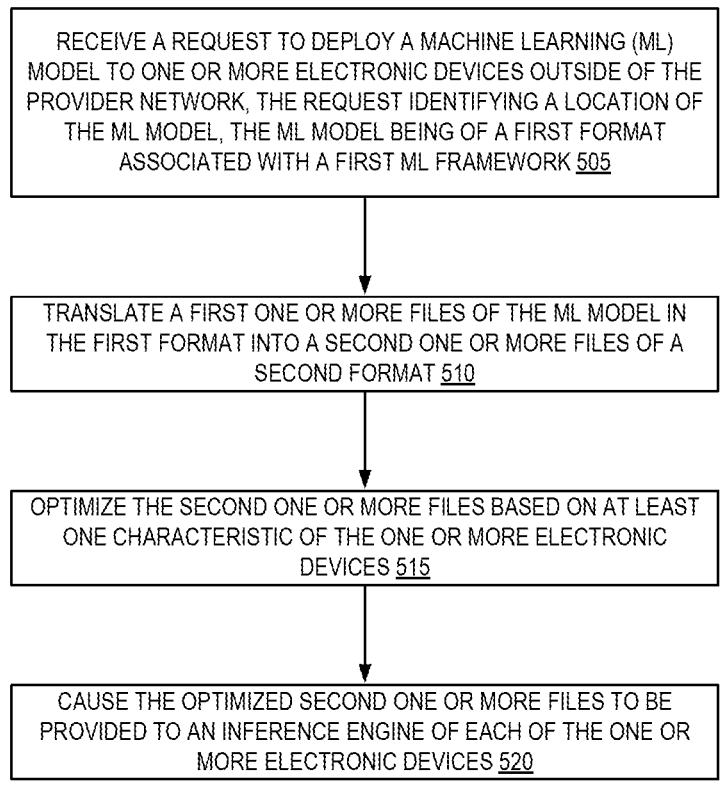
FIG. 5 is a flow diagram illustrating operations of a method for implementing high-performance machine learning inference in edge devices according to some embodiments.

FIG. 5 is a flow diagram illustrating operations of a method for implementing high-performance machine learning inference in edge devices according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by computing devices within the provider network 100 of the other figures, and individual operations may be performed by the edge device management service 110, storage service 116, and/or ML service 104. Additionally, ones of the operations 500 may be performed by the UIF client module 124 of the other figures.

The operations 500 include, at block 505, receiving a request to deploy a machine learning (ML) model to one or more electronic devices outside of a provider network. The request identifies a location of the ML model, where the ML model is of a first format associated with a first ML framework. Block 505 may be performed, for example, at an endpoint of a provider network 100, or by an edge device management service 110. The request may also identify one or multiple of the one or more electronic devices. The one or more electronic devices may be edge devices, which can be electronic computing devices located outside of the provider network that typically are deployed in particular environments of interest—i.e., outside of racks of a data center, as server computing devices often are. For example, the edge device(s) may include smart cameras, smart speakers, smart displays, environmental/biological sensor devices (e.g., wearable devices), smart phones, tablets, and the like. The one or more electronic devices may have been previously provisioned and thus registered with the edge device management service 110 (or another service of the provider network). The one or more electronic devices may include homogeneous devices having the same or similar hardware/computing resources, or may include heterogenous devices having different hardware/computing resources—e.g., different architectures, ISAs, chipsets, cores, processing units (e.g., CPUs, GPUs, FPGAs), memories, sensors, etc. The one or more electronic devices may have UIF client module 124 installed.

At block 510, the operations 500 also include, translating a first one or more files of the ML model in the first format into a second one or more files of a second format. Block 510 may be performed, for example, by a model optimizer 114A of a UIF server module 112 of the other figures. The first one or more files of the ML model in the first format may result from the ML model being trained using a first ML framework such as, for example, MXNet, Caffe, TensorFlow, PyTorch, etc. The second one or more files of a second format may or may not be associated with a publicly distributed ML framework—thus, although it could be one a format associated with MXNet, Caffe, TensorFlow, PyTorch, etc., the second format may also be of another format that is publicly available (e.g., ONNX) or is private, but runnable by inference engines 132 executing at the one or more electronic devices.

The operations 500 also include, at block 515, optimizing the second one or more files based on at least one characteristic of the one or more electronic devices. Block 515 may be performed by a UIF server module 112 or UIF client module 124, for example. The optimization may be hardware-agnostic (and thus create optimizations for all types of computing devices, such as via computational graph optimizations) or hardware specific (and thus create optimizations for specific types or categories of computing devices, such as those sharing a common architecture or set of capabilities). The optimization may include removing neural network layers with unused output to avoid unnecessary computation, combining or fusing certain layers (e.g., certain convolutional, bias, and/or ReLU activation layers) to form a single layer, combining layers via layer aggregation, performing quantization where certain data types may be changed (e.g., floating point values can be changed to integers) to reduce inference computational latency, analyzing the model and performing kernel fusion (e.g., similar to layer fusion, albeit one layer down in the stack and thus different kernels for different operators can be fused together), configuring improved (or optimal) scheduling for execution, etc.

At block 520, the operations 500 also include, causing the optimized second one or more files to be provided to an inference engine of each of the one or more electronic devices. Block 520 may be performed by the UIF server module 112 or edge device management service 110, where the optimized second one or more files are transmitted directly to the one or more electronic devices or to a client device (to be installed upon the one or more electronic devices by a user or application), or where the optimized second one or more files are placed in a storage location (e.g., of a storage service) where the one or more electronic devices will obtain these files. Block 520 may also be performed by a storage service 116, where the optimized second one or more files are transmitted to the one or more electronic devices, perhaps in response to a request for the files made by each of the one or more electronic devices.

Figure 6:
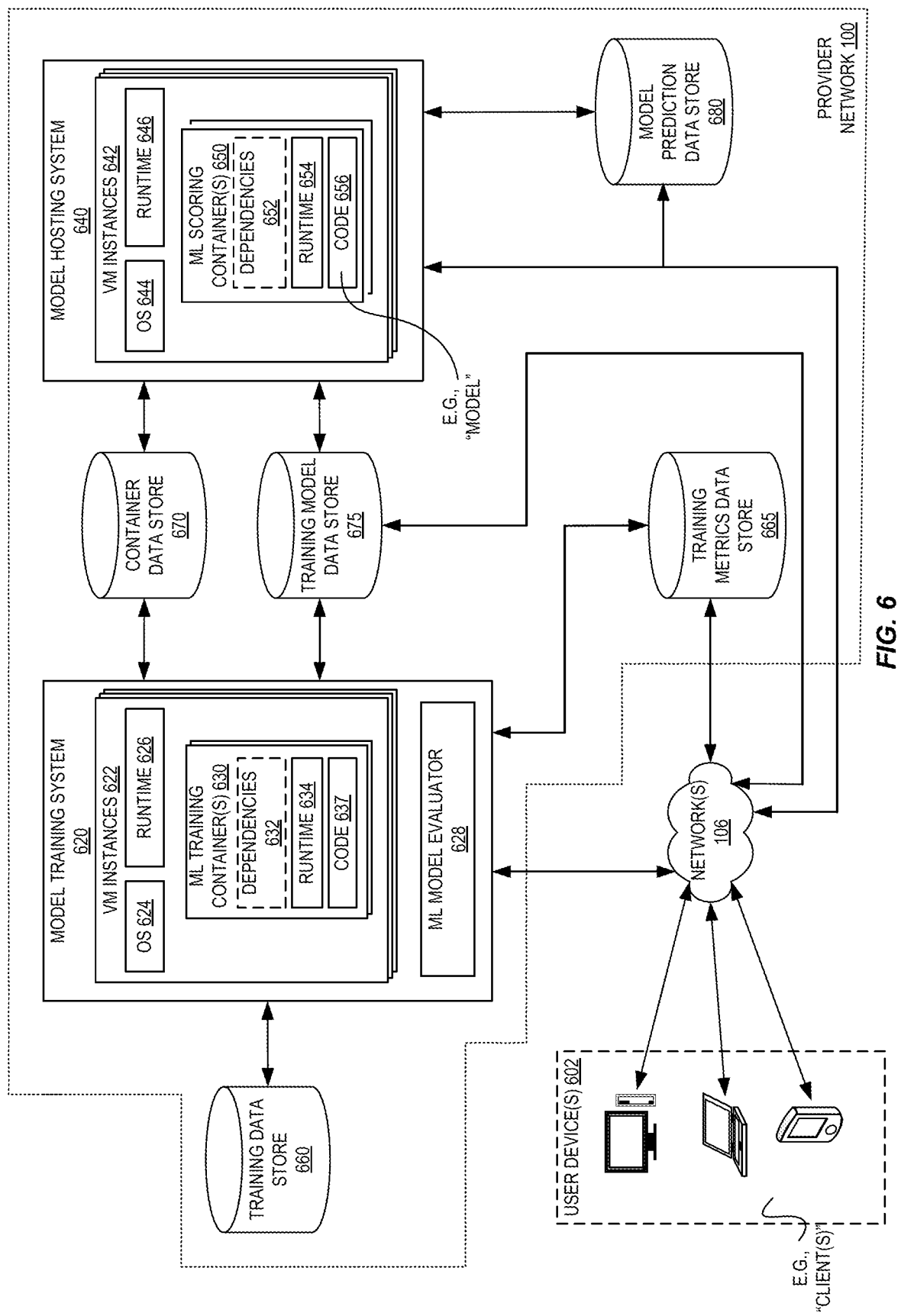
FIG. 6 is a block diagram of an illustrative operating environment in which machine learning models are trained and hosted according to some embodiments.

FIG. 6 is a block diagram of an illustrative operating environment in which machine learning models are trained and hosted according to some embodiments. The operating environment includes end user devices 602 (e.g., client device 120 and/or edge device(s) 122), a model training system 620, a model hosting system 640, a training data store 660, a training metrics data store 665, a container data store 670, a training model data store 675, and a model prediction data store 680.

A machine learning service described herein may include one or more of these entities, such as the model hosting system 640, model training system 620, etc.

In some embodiments, users, by way of user devices 602, interact with the model training system 620 to provide data that causes the model training system 620 to train one or more machine learning models. A machine learning model, generally, may be thought of as one or more equations that are "trained" using a set of data. In some embodiments, the model training system 620 provides ML functionalities as a Web service, and thus messaging between user devices 602 and the model training system 620 (or provider network 100), and/or between components of the model training system 620 (or provider network 100), may utilize HTTP messages to transfer data in a machine-readable file format, such as eXtensible Markup Language (XML) or JavaScript Object Notation (JSON).

The user devices 602 can interact with the model training system 620 via frontend 629 of the model training system 620. For example, a user device 602 can provide a training request to the frontend 629 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 602, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 602 may provide, in the training request, an algorithm written in any programming language. The model training system 620 then packages the algorithm into a container (optionally with other code, such as a "base" ML algorithm supplemented with user-provided code) that is eventually loaded into a virtual machine instance 622 for training a machine learning model, as described in greater detail below. For example, a user, via a user device 602, may develop an algorithm/code using an application (e.g., an interactive web-based programming environment) and cause the algorithm/code to be provided—perhaps as part of a training request (or referenced in a training request)—to the model training system 620, where this algorithm/code may be containerized on its own or used together with an existing container having a machine learning framework, for example.

In some embodiments, instead of providing a container image in the training request, the user device 602 provides, in the training request, an indicator of a container image (e.g., an indication of an address or a location at which a container image is stored). For example, the container image can be stored in a container data store 670, and this container image may have been previously created/uploaded by the user. The model training system 620 can retrieve the container image from the indicated location and create a container using the retrieved container image. The container is then loaded into a virtual machine instance 622 for training a machine learning model, as described in greater detail below.

The model training system 620 can use the information provided by the user device 602 to train a machine learning model in one or more pre-established virtual machine instances 622 in some embodiments. In particular, the model training system 620 includes a single physical computing device or multiple physical computing devices that are interconnected using one or more computing networks (not shown), where the physical computing device(s) host one or more virtual machine instances 622. The model training system 620 can handle the acquisition and configuration of compute capacity (e.g., containers, instances, etc., which are described in greater detail below) based on the information describing the computing machine on which to train a machine learning model provided by the user device 602. The model training system 620 can then train machine learning models using the compute capacity, as is described in greater detail below. The model training system 620 can automatically scale up and down based on the volume of training requests received from user devices 602 via frontend 629, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance and can be utilized to isolate execution of a task from other processes (e.g., task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (e.g., creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 637, and dependencies 632 needed by the code 637 in some embodiments. The runtime 634 can be defined by one or more executable instructions that form at least a portion of a container image that is used to form the ML training container 630 (e.g., the executable instruction(s) in the container image that define the operating system and/or runtime to run in the container formed from the container image). The code 637 includes one or more executable instructions that form at least a portion of a container image that is used to form the ML training container 630. For example, the code 637 includes the executable instructions in the container image that represent an algorithm that defines a machine learning model, which may reference (or utilize) code or libraries from dependencies 632. The runtime 634 is configured to execute the code 637 in response to an instruction to begin machine learning model training. Execution of the code 637 results in the generation of model data, as described in greater detail below.

In some embodiments, the code 637 includes executable instructions that represent algorithms that define different machine learning models. For example, the code 637 includes one set of executable instructions that represent a first algorithm that defines a first machine learning model and a second set of executable instructions that represent a second algorithm that defines a second machine learning model. In some embodiments, the virtual machine instance 622 executes the code 637 and trains all of the machine learning models. In some embodiments, the virtual machine instance 622 executes the code 637, selecting one of the machine learning models to train. For example, the virtual machine instance 622 can identify a type of training data indicated by the training request and select a machine learning model to train (e.g., execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 620 uses one or more container images included in a training request (or a container image retrieved from the container data store 670 in response to a received training request) to create and initialize a ML training container 630 in a virtual machine instance 622. For example, the model training system 620 creates a ML training container 630 that includes the container image(s) and/or a top container layer.

Prior to beginning the training process, in some embodiments, the model training system 620 retrieves training data from the location indicated in the training request. For example, the location indicated in the training request can be a location in the training data store 660. Thus, the model training system 620 retrieves the training data from the indicated location in the training data store 660. In some embodiments, the model training system 620 does not retrieve the training data prior to beginning the training process. Rather, the model training system 620 streams the training data from the indicated location during the training process. For example, the model training system 620 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (e.g., a buffer storing the retrieved portion is nearly empty), then the model training system 620 can retrieve a second portion of the training data and provide the second retrieved portion to the virtual machine instance 622, and so on.

To perform the machine learning model training, the virtual machine instance 622 executes code 637 stored in the ML training container 630 in some embodiments. For example, the code 637 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (e.g., coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 620 as input parameters to some or all of the instructions being executed.

In some embodiments, executing the executable instructions causes the virtual machine instance 622 (e.g., the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 620 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user device 602 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 675.

In some embodiments, a virtual machine instance 622 executes code 637 stored in a plurality of ML training containers 630. For example, the algorithm included in the container image can be in a format that allows for the parallelization of the training process. Thus, the model training system 620 can create multiple copies of the container image provided in a training request and cause the virtual machine instance 622 to load each container image copy in a separate ML training container 630. The virtual machine instance 622 can then execute, in parallel, the code 637 stored in the ML training containers 630. The virtual machine instance 622 can further provide configuration information to each ML training container 630 (e.g., information indicating that N ML training containers 630 are collectively training a machine learning model and that a particular ML training container 630 receiving the configuration information is ML training container 630 number X of N), which can be included in the resulting model data. By parallelizing the training process, the model training system 620 can significantly reduce the training time in some embodiments.

In some embodiments, a plurality of virtual machine instances 622 execute code 637 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 620 can create multiple copies of the container image provided in a training request, initialize multiple virtual machine instances 622, and cause each virtual machine instance 622 to load a container image copy in one or more separate ML training containers 630. The virtual machine instances 622 can then each execute the code 637 stored in the ML training containers 630 in parallel. The model training system 620 can further provide configuration information to each ML training container 630 via the virtual machine instances 622 (e.g., information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 620 can significantly reduce the training time in some embodiments.

In some embodiments, the model training system 620 includes a plurality of physical computing devices and two or more of the physical computing devices hosts one or more virtual machine instances 622 that execute the code 637. Thus, the parallelization can occur over different physical computing devices in addition to over different virtual machine instances 622 and/or ML training containers 630.

In some embodiments, the model training system 620 includes a ML model evaluator 628. The ML model evaluator 628 can monitor virtual machine instances 622 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (e.g., known results), and thus the ML model evaluator 628 can define a machine learning model using the model data and execute the machine learning model by providing the input data as inputs to the machine learning model. The ML model evaluator 628 can then compare the outputs of the machine learning model to the expected outputs and determine one or more quality metrics of the machine learning model being trained based on the comparison (e.g., the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user device 602, can access and retrieve the model metrics from the training metrics data store 665. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 602, can transmit a request to the model training system 620 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 620 can modify the machine learning model accordingly. For example, the model training system 620 can cause the virtual machine instance 622 to optionally delete an existing ML training container 630, create and initialize a new ML training container 630 using some or all of the information included in the request, and execute the code 637 stored in the new ML training container 630 to restart the machine learning model training process. As another example, the model training system 620 can cause the virtual machine instance 622 to modify the execution of code stored in an existing ML training container 630 according to the data provided in the modification request. In some embodiments, the user, via the user device 602, can transmit a request to the model training system 620 to stop the machine learning model training process. The model training system 620 can then instruct the virtual machine instance 622 to delete the ML training container 630 and/or to delete any model data stored in the training model data store 675.

As described below, in some embodiments, the model data stored in the training model data store 675 is used by the model hosting system 640 to deploy machine learning models. Alternatively or additionally, a user device 602 or another computing device (not shown) can retrieve the model data from the training model data store 675 to implement a learning algorithm in an external device. As an illustrative example, a robotic device can include sensors to capture input data. A user device 602 can retrieve the model data from the training model data store 675 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (e.g., rapid initialization of machine learning model training in ML training container(s) 630) in response to training requests.

In some embodiments, the model training system 620 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model hosting system 640, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 640 includes a single physical computing device or multiple physical computing devices that are interconnected using one or more computing networks (not shown), where the physical computing device(s) host one or more virtual machine instances 642. The model hosting system 640 can handle the acquisition and configuration of compute capacity (e.g., containers, instances, etc.) based on demand for the execution of trained machine learning models. The model hosting system 640 can then execute machine learning models using the compute capacity, as is described in greater detail below. The model hosting system 640 can automatically scale up and down based on the volume of execution requests received from user devices 602 via frontend 649 of the model hosting system 640, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance and can be utilized to isolate execution of a task from other processes (e.g., task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (e.g., creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (e.g., supporting software such as libraries) needed by the code 656 in some embodiments. The runtime 654 can be defined by one or more executable instructions that form at least a portion of a container image that is used to form the ML scoring container 650 (e.g., the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (e.g., predicted results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 640 uses one or more container images included in a deployment request (or a container image retrieved from the container data store 670 in response to a received deployment request) to create and initialize a ML scoring container 650 in a virtual machine instance 642. For example, the model hosting system 640 creates a ML scoring container 650 that includes the container image(s) and/or a top container layer.

As described above, a user device 602 can submit a deployment request and/or an execution request to the model hosting system 640 via the frontend 649 in some embodiments. A deployment request causes the model hosting system 640 to deploy a trained machine learning model into a virtual machine instance 642. For example, the deployment request can include an identification of an endpoint (e.g., an endpoint name, such as an HTTP endpoint name) and an identification of one or more trained machine learning models (e.g., a location of one or more model data files stored in the training model data store 675). Optionally, the deployment request also includes an identification of one or more container images stored in the container data store 670.

Upon receiving the deployment request, the model hosting system 640 initializes ones or more ML scoring containers 650 in one or more hosted virtual machine instance 642. In embodiments in which the deployment request includes an identification of one or more container images, the model hosting system 640 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 640 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 640 further forms the ML scoring container(s) 650 by retrieving model data corresponding to the identified trained machine learning model(s) in some embodiments. For example, the deployment request can identify a location of model data file(s) stored in the training model data store 675. In embodiments in which a single model data file is identified in the deployment request, the model hosting system 640 retrieves the identified model data file from the training model data store 675 and inserts the model data file into a single ML scoring container 650, which forms a portion of code 656. In some embodiments, the model data file is archived or compressed (e.g., formed from a package of individual files). Thus, the model hosting system 640 unarchives or decompresses the model data file to obtain multiple individual files and inserts the individual files into the ML scoring container 650. In some embodiments, the model hosting system 640 stores the model data file in the same location as the location in which the model data file was stored in the ML training container 630 that generated the model data file. For example, the model data file initially was stored in the top container layer of the ML training container 630 at a certain offset, and the model hosting system 640 then stores the model data file in the top container layer of the ML scoring container 650 at the same offset.

In embodiments in which multiple model data files are identified in the deployment request, the model hosting system 640 retrieves the identified model data files from the training model data store 675. The model hosting system 640 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 640 associates the initialized ML scoring container(s) 650 with the endpoint identified in the deployment request. For example, each of the initialized ML scoring container(s) 650 can be associated with a network address. The model hosting system 640 can map the network address(es) to the identified endpoint, and the model hosting system 640 or another system (e.g., a routing system, not shown) can store the mapping. Thus, a user device 602 can refer to trained machine learning model(s) stored in the ML scoring container(s) 650 using the endpoint. This allows for the network address of an ML scoring container 650 to change without causing the user operating the user device 602 to change the way in which the user refers to a trained machine learning model.

Once the ML scoring container(s) 650 are initialized, the ML scoring container(s) 650 are ready to execute trained machine learning model(s). In some embodiments, the user device 602 transmits an execution request to the model hosting system 640 via the frontend 649, where the execution request identifies an endpoint and includes an input to a machine learning model (e.g., a set of input data). The model hosting system 640 or another system (e.g., a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 640 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively or in addition, the virtual machine instance 642 transmits the output to the user device 602 that submitted the execution result via the frontend 649.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 602 via the frontend 649 (e.g., if no more trained machine learning models are needed to generate an output) or transmit the second output to a third ML scoring container 650 initialized in the same or different virtual machine instance 642 (e.g., if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (e.g., rapid initialization of ML scoring container(s) 650, rapid execution of code 656 in ML scoring container(s), etc.) in response to deployment and/or execution requests.

In some embodiments, the model hosting system 640 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model training system 620, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 620 and the model hosting system 640 depicted in FIG. 6 are not meant to be limiting. For example, the model training system 620 and/or the model hosting system 640 could also operate within a computing environment having a fewer or greater number of devices than are illustrated in FIG. 6. Thus, the depiction of the model training system 620 and/or the model hosting system 640 in FIG. 6 may be taken as illustrative and not limiting to the present disclosure. For example, the model training system 620 and/or the model hosting system 640 or various constituents thereof could implement various Web services components, hosted or "cloud" computing environments, and/or peer-to-peer network configurations to implement at least a portion of the processes described herein. In some embodiments, the model training system 620 and/or the model hosting system 640 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 602 and provisions virtual machine instances 622. In some embodiments, the frontend 629 serves as a front door to all the other services provided by the model training system 620. The frontend 629 processes the requests and makes sure that the requests are properly authorized. For example, the frontend 629 may determine whether the user associated with the training request is authorized to initiate the training process.

Similarly, frontend 649 processes all deployment and execution requests received from user devices 602 and provisions virtual machine instances 642. In some embodiments, the frontend 649 serves as a front door to all the other services provided by the model hosting system 640. The frontend 649 processes the requests and makes sure that the requests are properly authorized. For example, the frontend 649 may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 620 and the model hosting system 640, this is not meant to be limiting. For example, in some embodiments not shown, the training data store 660 is located internal to at least one of the model training system 620 or the model hosting system 640.

In some embodiments, the training metrics data store 665 stores model metrics. While the training metrics data store 665 is depicted as being located external to the model training system 620 and the model hosting system 640, this is not meant to be limiting. For example, in some embodiments not shown, the training metrics data store 665 is located internal to at least one of the model training system 620 or the model hosting system 640.

The container data store 670 stores container images, such as container images used to form ML training containers 630 and/or ML scoring containers 650, that can be retrieved by various virtual machine instances 622 and/or 642. While the container data store 670 is depicted as being located external to the model training system 620 and the model hosting system 640, this is not meant to be limiting. For example, in some embodiments not shown, the container data store 670 is located internal to at least one of the model training system 620 and the model hosting system 640.

The training model data store 675 stores model data files. In some embodiments, some of the model data files are comprised of a single file, while other model data files are packages of multiple individual files. While the training model data store 675 is depicted as being located external to the model training system 620 and the model hosting system 640, this is not meant to be limiting. For example, in some embodiments not shown, the training model data store 675 is located internal to at least one of the model training system 620 or the model hosting system 640.

The model prediction data store 680 stores outputs (e.g., execution results) generated by the ML scoring containers 650 in some embodiments. While the model prediction data store 680 is depicted as being located external to the model training system 620 and the model hosting system 640, this is not meant to be limiting. For example, in some embodiments not shown, the model prediction data store 680 is located internal to at least one of the model training system 620 and the model hosting system 640.

While the model training system 620, the model hosting system 640, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 602 via the one or more network(s) 106.

Various example user devices 602 are shown in FIG. 6, including a desktop computer, laptop, and a mobile phone, each provided by way of illustration. In general, the user devices 602 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 620 and/or the model hosting system 640 provides the user devices 602 with one or more user interfaces, command-line interfaces (CLI), application programming interfaces (API), and/or other programmatic interfaces for submitting training requests, deployment requests, and/or execution requests. In some embodiments, the user devices 602 can execute a standalone application that interacts with the model training system 620 and/or the model hosting system 640 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (e.g., for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
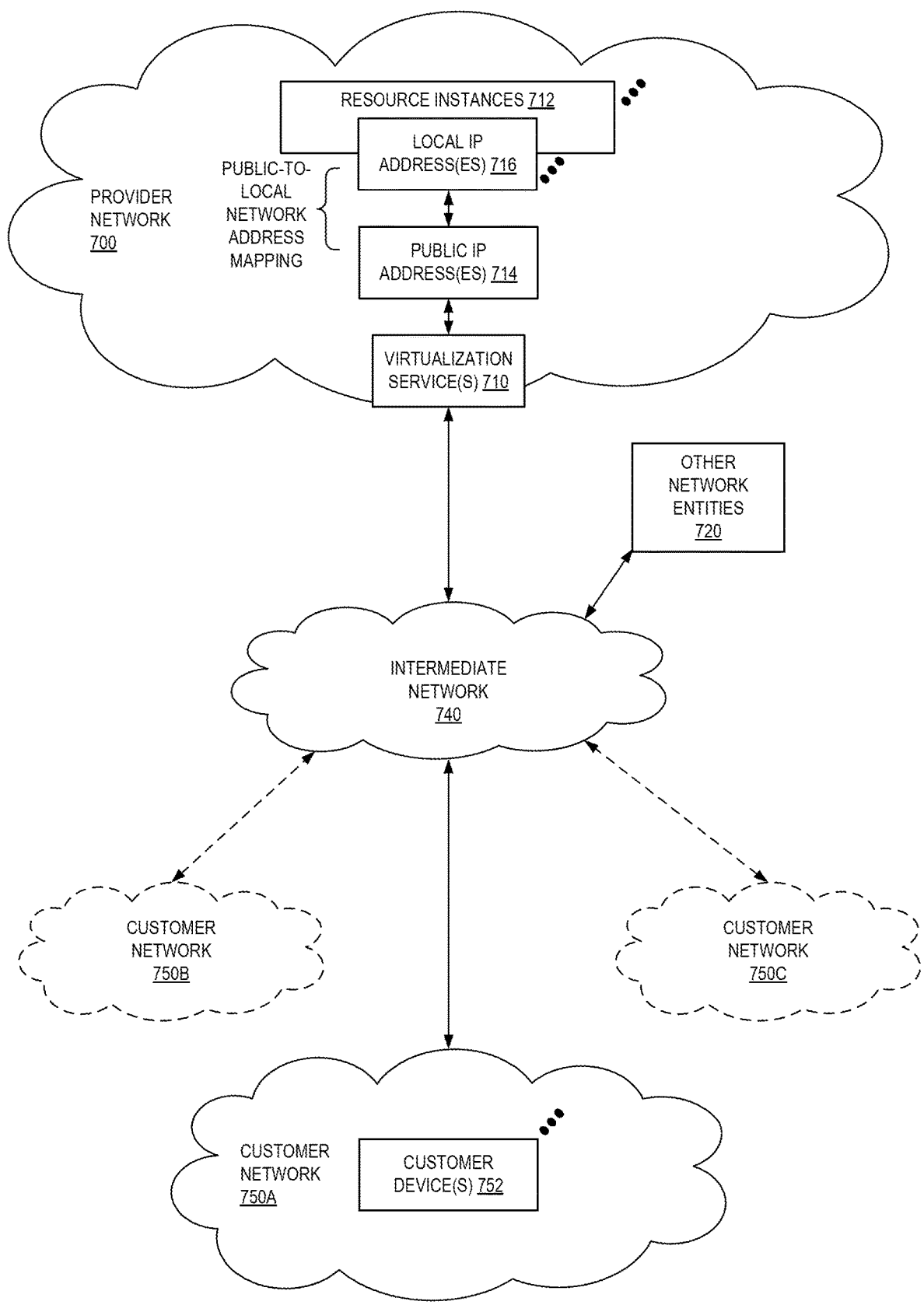
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
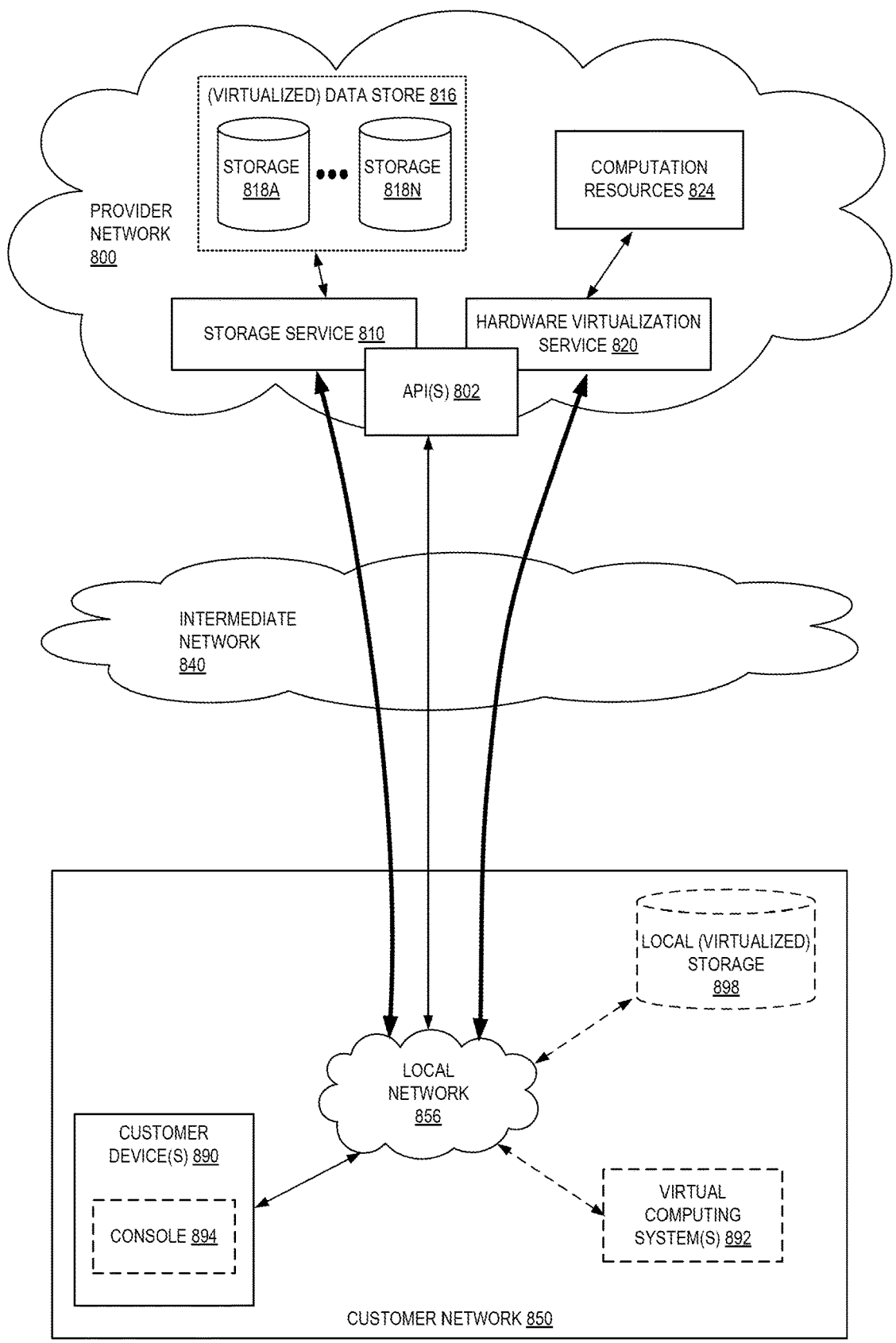
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
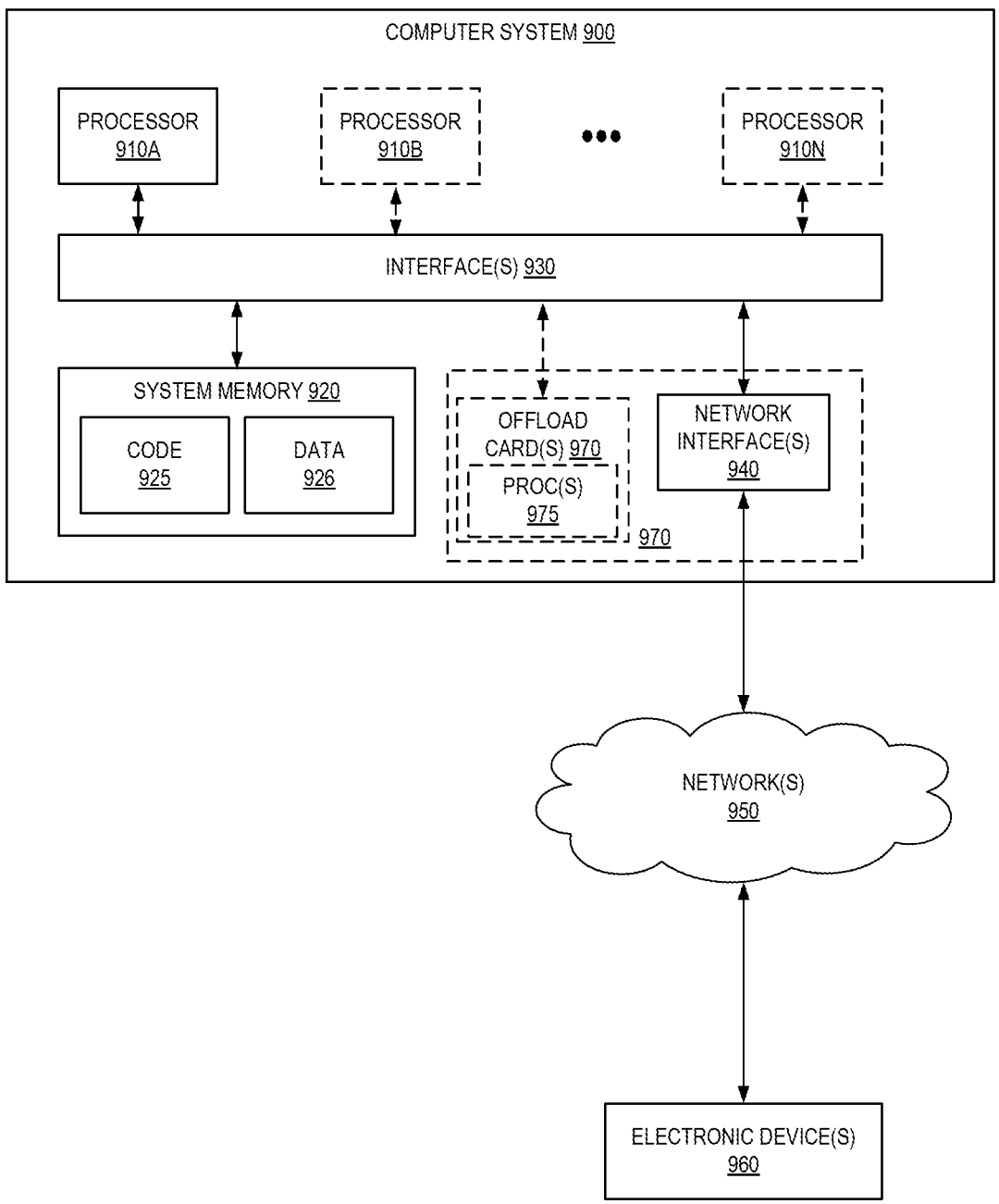
FIG. 9 is a block diagram illustrating an example computer system that may be used in some embodiments.

In some embodiments, a system that implements a portion or all of the techniques for high-performance machine learning inference in heterogeneous edge devices as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Figure 10:
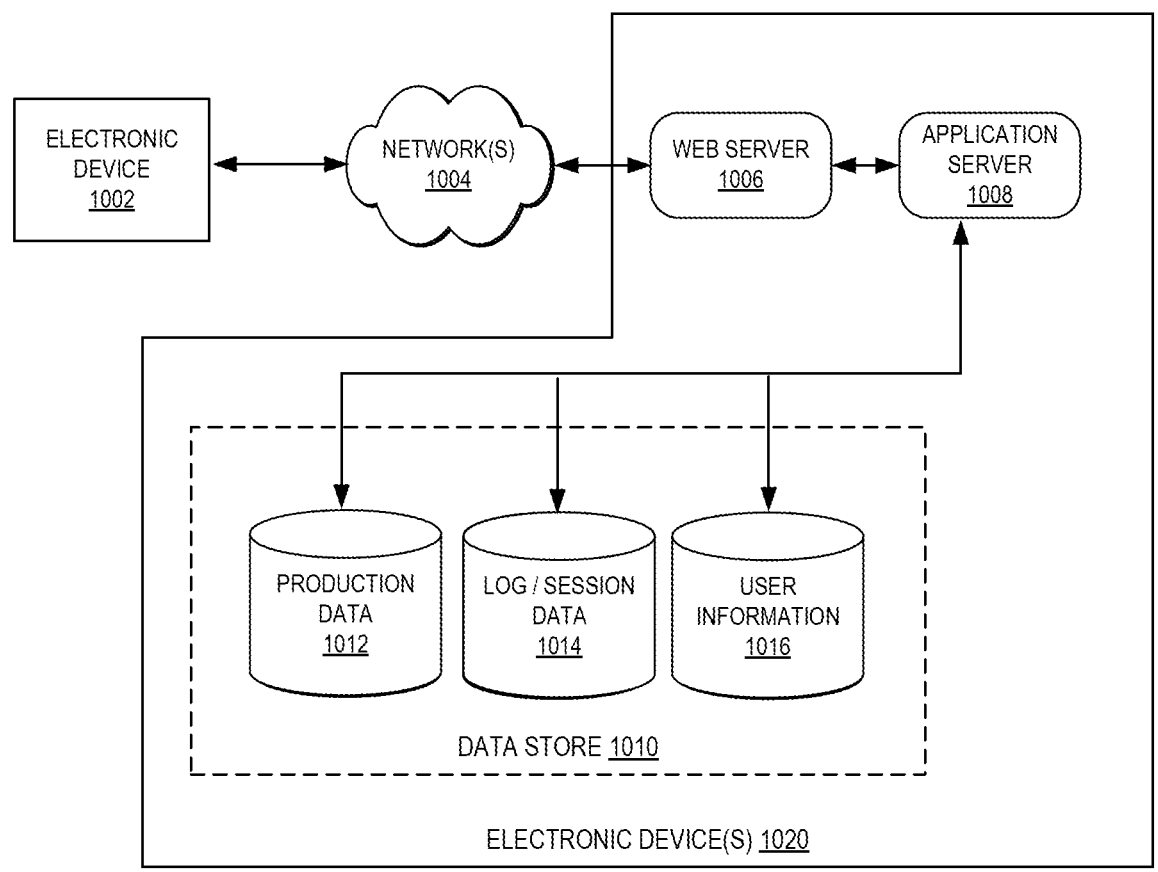
FIG. 10 illustrates an example of an environment for implementing aspects in accordance with various embodiments.

As discussed herein, different approaches can be implemented in various environments in accordance with the described embodiments. For example, FIG. 10 illustrates an example of an environment 1000 for implementing aspects in accordance with various embodiments. For example, in some embodiments the request messages described are HTTP requests that are received by a web server (e.g., web server 1006), and the users, via electronic devices, may interact with the provider network via a web portal provided via the web server 1006 and application server 1008. As will be appreciated, although a web-based environment is used for purposes of explanation, different environments may be used, as appropriate, to implement various embodiments. The system includes an electronic client device 1002, which may also be referred to as a client device and can be any appropriate device operable to send and receive requests, messages or information over an appropriate network 1004 and convey information back to a user of the device 1002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1004 includes the Internet, as the environment includes a web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio, video, etc., to be transferred to the client device 1002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1002 and the application server 1008, can be handled by the web server 1006. It should be understood that the web server 1006 and application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information 1016 to verify the identity of the user and can access a production data 1012 to obtain information about items of that type. The information can then be returned to the user, such as in a listing of results on a web page that the user is able to view via a browser on the user device 1002. Information for a particular item of interest can be viewed in a dedicated page or window of the browser.

The web server 1006, application server 1008, and/or data store 1010 may be implemented by one or more electronic devices 1020, which can also be referred to as electronic server devices or server end stations, and may or may not be located in different geographic locations. Each of the one or more electronic devices 1020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment may be a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 122A-122N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method implemented in a provider network, the method comprising:
   translating a first one or more files of a first machine learning (ML) model of a first format associated with a first ML framework into a second one or more files of a second format;
   optimizing the second one or more files based on at least one hardware characteristic of a first one or more electronic devices outside the provider network to generate optimized second one or more files, the optimizing including performing one or more of layer fusion, quantization, optimal scheduling, or kernel fusion;
   causing the optimized second one or more files to be provided to the first one or more electronic devices for use by one or more inference engines of the first one or more electronic devices;
   translating a third one or more files of a second ML model of a third format associated with a second ML framework that is different from the first ML framework into a third one or more files of a third format;
   optimizing the third one or more files based on at least one hardware characteristic of a second one or more electronic devices outside the provider network to generate optimized third one or more files, the optimizing including performing one or more of layer fusion, quantization, optimal scheduling, or kernel fusion; and
   causing the optimized third one or more files to be provided to the second one or more electronic devices for use by one or more inference engines of the second one or more electronic devices.

2. The computer-implemented method of claim 1, wherein translating the first one or more files of the first ML model of the first format associated with the first ML framework into the second one or more files of the second format is performed by a translator module of a model optimizer in the provider network.

3. The computer-implemented method of claim 2, wherein the model optimizer is executed by a server module of an edge device management service in the provider network.

4. The computer-implemented method of claim 1, wherein:
   the first ML framework comprises one of MXNet, Caffe, TensorFlow, or PyTorch; and
   the second ML framework comprises a different one of MXNet, Caffe, TensorFlow, or PyTorch.

5. The computer-implemented method of claim 1, wherein the second format is a unified format that can be run by inference engines of different devices having different ML frameworks.

6. The computer-implemented method of claim 1, wherein translating the first one or more files of the first ML model of the first format associated with the first ML framework into the second one or more files of the second format comprises identifying weights in model files generated by the first ML framework and inserting the weights within model files of the second format.

7. The computer-implemented method of claim 1, wherein optimizing the second one or more files based on at least one hardware characteristic of the first one or more electronic devices outside the provider network is performed by a model optimizer executed by a server module of an edge device management service in the provider network.

8. The computer-implemented method of claim 1, wherein optimizing the second one or more files based on at least one hardware characteristic of the first one or more electronic devices outside the provider network comprises one or more computational graph optimizations.

9. The computer-implemented method of claim 1, further comprising:
   receiving a request to train the first ML model; and
   training, within the provider network, the first ML model.

10. The computer-implemented method of claim 9, further comprising outputting the first one or more files of the first ML model to a storage location provided by a storage service of the provider network.

11. A system comprising:
    an edge device management service implemented by one or more electronic devices of a provider network, the edge device management service including one or more processors and memory storing instructions that, upon execution by the one or more processors, cause the edge device management service to:
      translate a first one or more files of a first machine learning (ML) model of a first format associated with a first ML framework into a second one or more files of a second format;
      optimize the second one or more files based on at least one hardware characteristic of a first one or more electronic devices outside the provider network to generate optimized second one or more files, the optimizing including performing one or more of layer fusion, quantization, optimal scheduling, or kernel fusion;
      cause the optimized second one or more files to be provided to the first one or more electronic devices for use by one or more inference engines of the first one or more electronic devices;
      translate a third one or more files of a second ML model of a third format associated with a second ML framework that is different from the first ML framework into a third one or more files of a third format;
      optimize the third one or more files based on at least one hardware characteristic of a second one or more electronic devices outside the provider network to generate optimized third one or more files, the optimizing including performing one or more of layer fusion, quantization, optimal scheduling, or kernel fusion; and
      cause the optimized third one or more files to be provided to the second one or more electronic devices for use by one or more inference engines of the second one or more electronic devices.

12. The system of claim 11, wherein translating the first one or more files of the first ML model of the first format associated with the first ML framework into the second one or more files of the second format is performed by a translator module of a model optimizer in the provider network.

13. The system of claim 12, wherein the model optimizer is executed by a server module of the edge device management service.

14. The system of claim 11, wherein:
    the first ML framework comprises one of MXNet, Caffe, TensorFlow, or PyTorch; and the second ML framework comprises a different one of MXNet, Caffe, TensorFlow, or PyTorch.

15. The system of claim 11, wherein the second format is a unified format that can be run by inference engines of different devices having different ML frameworks.

16. The system of claim 11, wherein translating the first one or more files of the first ML model of the first format associated with the first ML framework into the second one or more files of the second format comprises identifying weights in model files generated by the first ML framework and inserting the weights within model files of the second format.

17. The system of claim 11, wherein optimizing the second one or more files based on at least one hardware characteristic of the first one or more electronic devices outside the provider network is performed by a model optimizer executed by a server module of the edge device management service.

18. The system of claim 11, wherein optimizing the second one or more files based on at least one hardware characteristic of the first one or more electronic devices outside the provider network comprises one or more computational graph optimizations.

19. The system of claim 11, wherein the one or more electronic devices of the provider network implementing the edge device management service comprise a first one or more electronic devices, and wherein the memory stores further instructions that, upon execution by the one or more processors, further cause the edge device management service to:
 receive a request to train the first ML model; and
 invoke a ML service implemented by a second one or more electronic devices of the provider network to train the first ML model.

20. The system of claim 19, wherein the memory stores further instructions that, upon execution by the one or more processors, further cause the edge device management service to output the first one or more files of the first ML model to a storage location provided by a storage service implemented by a third one or more electronic devices of the provider network.

* * * * *